Figure 1:
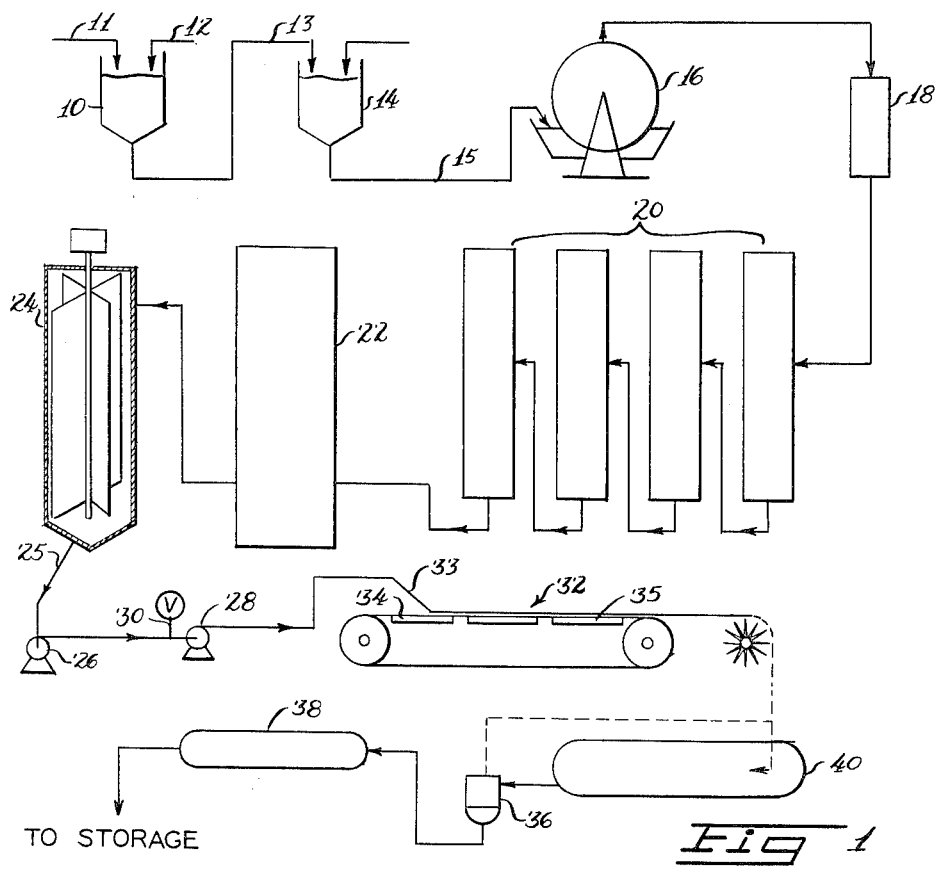

Feb. 22, 1966     N. B. SMITH ETAL     3,236,687
PROCESS FOR PRODUCING SUGARS FROM STARCH
Filed July 9, 1962

TO STORAGE

Inventors
Norman B. Smith
Edgar N. Petzold
BY
Olson, Mecklenburger, von Holst,
Pendleton & Newman Attys

United States Patent Office 3,236,687
Patented Feb. 22, 1966

3,236,687
PROCESS FOR PRODUCING SUGARS FROM STARCH
Norman B. Smith, Muscatine, and Edgar N. Petzold, Charles City, Iowa, assignors to Grain Processing Corporation, Muscatine, Iowa, a corporation of Iowa
Filed July 9, 1962, Ser. No. 208,409
21 Claims. (Cl. 127—38)

This invention relates to a new process for the manufacture of sugars from sugar-containing solutions such as are produced by the acid or enzyme hydrolysis of starches.

Several methods have been developed in the art to produce crystalline sugars, specifically crystalline glucose (dextrose), using starch as the basic material. Very early methods related to the manufacture of what is commonly called "70" and "80" sugars. According to these methods, starch such as potato or corn is acid hydrolyzed to produce an impure sugar containing a maximum of about 70 or 80 percent glucose. The syrups produced by concentrating the hydrolyzates were cast in blocks, allowed to crystallize for several days, removed from the forms, chipped and subsequently dried to a final moisture content. The low glucose content of the "70" and "80" sugars as well as the high amounts of impurities in the blocks resulted in very low demand for the product, while manufacturing costs of such processes were high due to considerable tie-up in equipment and material during the long, slow crystallization process. As the art developed further, it was found that glucose crystals produced by a batch process could be separated satisfactorily from their mother liquor by employing centrifugal force. This "motion" crystallization procedure as it has become known has been used widely to produce crystalline glucose. A variety of other specific methods were developed in this art directed to improvements in the technique of crystallizing and separating the glucose from the mother liquor such as, for example, spraying the glucose-containing liquor on a bed of glucose seed crystals and so forth.

The various prior art processes for producing crystalline glucose usually have one or more serious disadvantages which, from a commercial standpoint, greatly detract from their attractiveness. One major disadvantage encountered in the manufacture of glucose by the prior art methods is the relatively low recovery of glucose. With acid hydrolyzed starch and crude crystallization procedures, the maximum amount of glucose generally recovered is about 80 percent of theoretical. These low recovery yields are due to the glucose being lost along with impurities in hydrol; hydrol being the glucose-containing by-product of conventional processes. As the art of glucose manufacture developed, particularly with respect to recently developed refining techniques such as the use of ion exchange resins and the like, glucose yields of approximately 90 percent of theoretical can be obtained. Moreover, hydrolysis of starch with microbiological enzymes provides slightly higher glucose yields due to the formation of smaller quantities of impurities in the hydrolyzates and a corresponding reduction in the loss of glucose normally accompanying the separation of impurities. In spite of these recent developments, the prior art processes generally fail to provide substantially complete, i.e. approximately 100 percent recovery of crystalline glucose. Moreover, prior art processes for glucose production which involve crystallization and separation of the glucose crystals from the mother liquor have certain other inherent disadvantages. The crystallization step is usually slow resulting in considerable tie-up in equipment and material for long periods and precludes the production of glucose on a continuous basis. In addition, in these prior art crystallization processes a glucose-containing molasses is obtained which is of little value and presents a disposal problem which contributes to the overall cost of the sugar process.

It is therefore a primary object of this invention to provide a new method for the manufacture of crystalline sugars from sugar-containing solutions which method obviates certain of the major disadvantages of the known prior art processes.

It is another object of the invention to provide an improved continuous process for the production of sugars such as glucose from starch hydrolyzates.

It is another object of the invention to produce a crystalline sugar such as glucose by a process which can be readily carried out in a minimum amount of processing time using available equipment.

It is a still further important object of the invention to provide a process for producing sugar from starch wherein substantially complete recovery of the sugar is achieved.

Another object of the invention is to provide a process for producing glucose from starch wherein crystallization and separation of the glucose crystals from the mother liquor is avoided, thereby eliminating the production of by-product molasses and the use of costly crystallization and centrifugation equipment.

A still further object of the invention is to provide a process for producing crystalline glucose wherein the process operating conditions can be varied to control the composition of the sugar product with respect to its isomeric forms.

These and other objects of the invention will become apparent as the description of the new process of the invention proceeds.

Briefly, the present invention provides a process for producing crystalline sugars which comprises liquefying and hydrolyzing starch or a starch conversion product by means of a mineral acid or with microbiological enzymes to produce conversion of the starch to sugars, principally glucose. The starch converted glucose solution is concentrated to above about 88 and preferably from about 92 to about 99 percent solids content, a small amount of gas mixed therewith and the concentrated sugar solution subjected to a shearing force which is envisioned to cause crystallization of the glucose. The so-treated glucose solution is then rapidly solidified and the solidified glucose product recovered and further processed as desired. By means of the present invention, sugars can be economically and efficiently produced which are especially suitable for use in a variety of applications such as, for example, soft drinks, bakery products, custards, puddings and other dessert products and the like or in sugar fermentation processes and so forth.

The novel process of the present invention will be further described in conjunction with the accompanying drawings in which FIGURE 1 is a flow sheet illustrating one presently preferred embodiment of the complete process. Referring to FIGURE 1, the numeral 10 designates a reaction vessel wherein liquefaction of raw ungelatinized starch or starch product is effected. All varieties of starch, starch products and amylaceous materials can be used in the process. An aqueous slurry of the starch to be converted is introduced through line 11 and a liquefying agent added to the starch slurry through line 12. Liquefaction of the starch so as to reduce the very high viscosity of the native starch when it is dispersed in water can be accomplished in a number of known ways as by the use of a mineral acid such as hydrochloric or by the use of enzymes such as alpha-amylase. The liquefaction treatment can be a combination of two or more procedures as for example an alpha-amylase treatment combined with a physical treatment such as forcing the starch paste through a homogenizer. In any event, liquefaction is carried out to an extent to provide a workable fluid having a solids concentration from about 25 to 50 percent by weight, preferably 35 percent by weight, when the temperature of the liquid is in the range from about 113° F. to 122° F.

Following liquefaction of the starch, the slurry is pumped via line 13 to conversion tank 14 wherein hydrolysis of the starch is effected in orthodox manner utilizing either mineral acids or enzymes to convert substantially all of the starch to sugar. Preferably, hydrolysis of the liquefied starch is accomplished with a glucamylase (amyloglucosidase) enzyme. Typically, hydrolysis of the starch with pure glucamylase enzyme is effected at a temperature within the range of about 95 to 140° F. and at a pH between 4 and 6.5. The length of time required for the starch hydrolysis depends upon several operating variables such as the ratio of glucamylase to substrate, pre-treatment of the starch, addition of assisting enzymes, the temperature and pH levels employed and substrate concentration. The hydrolysis may be followed in practice by analytical determinations which are well known in the art, such as, for example, the Lane and Eynon modified Fehlings test for sugar. Hydrolysis of the starch is continued until by analysis the action of the glucamylase has been substantially completed under the operating conditions chosen and the amount of glucose in the hydrolyzate is more than about 85 percent and preferably from 90 to 100 percent on a dry basis.

Following the hydrolysis stage, the hydrolyzate is passed through line 15 and filtered in suitable equipment such as a vacuum precoat filter 16 to remove insoluble materials. Filter aid materials are advantageously employed to assist in the filtration and the temperature of the hydrolyzate is maintained at from about 120–140° F. to increase the filtration rate. If necessary or if desired the filtrate from filter 16 can be subjected to a second filtration in a finishing type filter 18 which can be a plate and frame or leaf type filter. Again conventional filter aids can be employed in this polishing filtration.

When an extremely high purity sugar product is desired, the filtrate from the filter 18 can be purified by passing it through a series of ion exchange columns 20 which contain suitable ion exchange resins which serve to remove various impurities which may be present in the starch hydrolyzate such as color-forming bodies and ash-forming solids. It is to be noted that this ion exchange purification step is optional in practicing the process of the present invention and need be used only if a very high purity sugar product is desired.

The glucose containing hydrolyzate is then concentrated to a solids content of at least about 88 percent, high solids concentrations on this order having been found necessary in the present process. Preferably this concentration is effected in two stages; the primary evaporation at 22 removing sufficient water to obtain a solids level of about 70–75 percent in the hydrolyzate. This primary evaporation step can be accomplished by the use of standard forced circulation evaporators wherein the hydrolyzate is heated to temperatures as high as about 180–190° F. without risk of experiencing serious adverse effects in the hydrolyzate such as undesirable color formation or glucose degradation.

The secondary evaporation which is carried out in evaporator 24 removes further quantities of water to produce a sugar syrup having a solids content above 88 percent and preferably in the range from about 92 to about 99 percent. Various types of conventional evaporators can be employed satisfactorily to obtain these high solids concentrations. However, preferred evaporators for use at this stage of the process are evaporators of the type which mechanically sweep a thin film of sugar syrup on a heated surface of the evaporator resulting in good transfer of heat to the syrup and efficiently achieving the required concentration to a very high solids content. The secondary evaporation at 24 is preferably carried out at a minus pressure so that lower temperatures can be employed in the evaporation thereby minimizing the risks of causing adverse effects in the sugar product. Operation of evaporator 24 under a vacuum of from about 18 to 22 inches of mercury has been found eminently satisfactory and permits moderate sugar product temperatures from about 190 to 210° F. to be utilized for the evaporation.

After concentration of the glucose-containing solution in evaporator 24 to a satisfactory high solids content, the concentrated sugar syrup is removed via line 25 by means of pump 26 and passed through a second pump 28 which is capable of exerting a shearing action on the sugar syrup. Gear type pumps in which the fluid is subjected to a shearing action by the meshing gears are suitable and preferred for this purpose. At this stage the present process differs radically from the prior art processes which involve crystallization of the glucose and separation of the glucose crystals from the mother liquor. Quite unexpectedly it has been found that by mixing a small amount of a gas with the concentrated sugar syrup and subjecting the sugar syrup to a shearing force such as is exerted by a gear type pump, substantially instantaneous solidification of the sugar syrup is attained. The intensity of the shearing force to which the syrup is subjected is difficult to define accurately because of the various types of equipment which can be utilized in this stage of the process. However, it can be said that the sugar syrup is subjected to a shearing action considerably more intense than is normally encountered as a result of being pumped through ordinary liquid pumps. Various means and various types of equipment capable of exerting a shearing force on the sugar syrup can be used, but, as indicated, pumps of the gear type which exert a shearing action on the sugar syrup are preferred. Gear type pumps of this type are known to the art and find use in pumping liquids of high solid concentrations and for pumping fluids in vacuum systems. The gear pump 28 is ordinarily operated in commercial operations at rotational speeds adapted to provide a satisfactory rate of sugar production. In one preferred manner of operation the shearing pump 28 is operated at a higher throughput rate than that of pump 26. For example, pump 28 is operated at a rotational speed of 300 r.p.m. and pump 26 is operated at a rotational speed of 100 r.p.m. By operating in this manner, a vacuum is created between the pumps 26 and 28 so that a gas such as air can be introduced through bleed line 30 and mixed with the sugar syrup. In an alternative embodiment, a triple gear pump of the type commonly used in the manufacture of ice cream to aerate the product can be used in lieu of pumps 26 and 28 to exert a shearing action on the sugar syrup and at the same time incorporate therewith small amounts of a gas.

It has been found in the course of the investigation of the new process herein described that the introduction of a gas such as air into the sugar syrup together with subjecting the syrup to high shearing stresses are absolutely necessary to achieve substantially instantaneous solidification of the crystalline glucose, thereby permitting continuous operation. Without shear and gasification, a glassy, sticky, amorphous product results which presents extreme difficulties in handling, storage and use. However, the amount of gas mixed with the sugar syrup is not critical since relatively small or trace amounts of gas are effective. On the other hand, when excessive amounts of gas are injected into the syrup, spurting of the syrup frequently results and for this reason it is preferred to avoid the use of excessive amounts of gas. For example, when operating with a sugar syrup of about 96 percent solids concentration, from about 3 to 12 cubic feet of air per gallon of syrup is preferably employed.

With other solids concentrations lesser or greater amounts of gas can be employed satisfactorily.

After being subjected to relatively intense shearing action in the presence of a gas, the sugar syrup rapidly solidifies, usually in a matter of minutes, to a crystalline solid composed principally of glucose. To this end, the highly concentrated sugar syrup discharging from pump 28 at a temperature usually in the range from about 180 to 220° F. can be cooled under controlled conditions to complete solidification. The extent of cooling of the sugar product will depend on the particular operation and subsequent processing of the sugar product. If the sugar product is to be subjected to further processing at elevated temperatures, the sugar can, for economy in operation, be maintained at an elevated temperature below the melting point of the sugar until solidification is completed, a somewhat longer period being required generally. In any event, the sugar is maintained at an elevated temperature such as above about 160° F. for several minutes after it is removed from shear pump 28 in order to insure substantially complete crystal development. Alternatively, if it is desired to accelerate complete solidification of the sugar product, following the initial retention at an elevated temperature, the sugar product can be cooled to a relatively low temperature such as 80° F. If the sugar product is cooled immediately after discharge from pump 28, crystal growth is impaired and an unsatisfactory sticky amorphous final sugar product results.

In a preferred embodiment of the process of the invention the highly concentrated sugar syrup discharging from pump 28 is distributed on a moving band conveyor 32 adapted for maintaining the sugar product at predetermined temperatures during the solidification period. One such band conveyor suitable for this purpose is described in United States Patent No. 2,437,492, to Allen, dated March 9, 1948 and consists essentially of an endless steel or other heat conducting band having means associated therewith for containing cooling liquid at different temperatures. This type of band conveyor permits a product distributed thereon to be held at a relatively high temperature initially and thereafter cooled to a temperature which facilitates handling of the product. Utilizing such a suitable band conveyor the sugar syrup is deposited upon its top surface from feed chute 33 so that it spreads out to form a thin uniform layer that is continuously carried along by the band. The section 34 of the conveyor 32 adjacent the point of introduction of the sugar is designated the "hot" section and is maintained at a temperature from about 90 to 212° F. and preferably 140 to 180° F. The opposite end 35 of the conveyor designated the "cooling" section is maintained at a temperature below 90° F. In a preferred manner of operation, the sugar product is maintained at a temperature of about 160° F. or above for 2 or 3 minutes after it is deposited on the conveyor, after which it is cooled to accelerate complete solidification. By cooling the sugar to a temperature not substantially above 100° F. on the cooling section 35 of the conveyor, the sugar completely solidifies in a period of about 3 or 4 minutes to a relatively hard sheet comprising substantially pure glucose. The thickness of this sugar sheet is governed by the rate of sugar production and specifically the rate at which the sugar is deposited on the conveyor. The thickness of the sugar slab is limited also by the efficiency of heat transfer during the cooling cycle. As illustrative, when employing a conveyor of about 11 feet in length and an effective width of 6 inches, having a hot section of 4.5 feet in length maintained at a temperature of 180° F. and a cooling section of 6.5 feet in length maintained at a temperature of 55° F., sugar can be deposited on the conveyor at a rate of about 1 pound per minute with a total time on the conveyor of about 5 to 9 minutes.

The sugar product discharging from the cooling section 35 of the conveyor 32 can be ground or milled in mill 36 to obtain a granular sugar product and then dried in dryer 38 to a final moisture content not substantially exceeding about 1 percent. The moisture content of the final sugar product should be below 1 percent in order that the sugar be free flowing and non-hydroscopic in nature. Dryer 38 can be any type of warm air dryer commonly used for removing moisture from granular solids with this precaution being observed, that the air temperature employed in the drying operation should not substantially exceed about 240° F. in order to avoid carmelizing or melting the sugar.

The glucose sugar as it is produced by the above described process generally comprises a mixture of isomers, the mixture normally containing about 40 to 65 percent of the alpha-d-glucose and about 35 to 60 percent of beta-d-glucose. We have found that it is possible when practicing the present invention to selectively vary and significantly increase the content of the alpha-d-glucose isomer in the final product by conditioning the sugar as will be described prior to final drying of the product. This feature of the invention is in itself unique and constitutes a particularly advantageous embodiment of the invention which at the option of the producer can be employed to obtain a sugar product high in alpha-d-glucose content. Conditioning of the sugar product to adjust the alpha-d-glucose isomer content is accomplished by holding the sugar product obtained from the conveyor 32 at elevated temperatures for varying periods of time to effect mutarotation of the glucose isomers. When the glucose sugar product is maintained at elevated temperatures such as from about 120–180° F. for a period of time ranging from 3 to 4 hours it is possible to obtain a final product containing about 80 to 85 percent of the alpha-d-glucose isomer. Longer periods, such as for example 24 hours, further increase the percent of alpha-d-glucose isomer with the content of that isomer eventually approaching 100 percent if desired. Shorter conditioning periods result in less mutarotation to the alpha-d-glucose form and the sugar contains a greater proportion of the beta-d-isomer. In order that mutarotation of the isomers proceeds, it is necessary that some moisture be present in the sugar while it is being conditioned at the elevated temperatures. Generally the moisture content in the sugar which is to be conditioned should be within the range from about 2 to 8 percent by weight. For convenience in handling, the sugar can be ground or milled prior to the conditioning operation but the particle size of the milled product should not be so small as to prevent the sugar crystals from retaining some moisture while being conditioned at the elevated temperature. Generally particle sizes above about 8 mesh should be employed.

Figure 2:
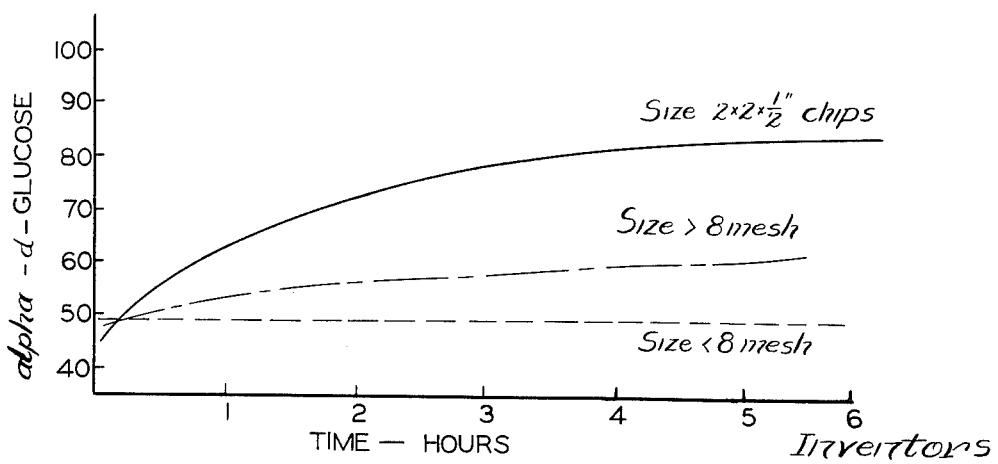

The conditioning time or residence time at the elevated temperatures required for obtaining a specified alpha-d-glucose content in the sugar product depends upon the temperature maintained in the conditioner 40 as well as the particle size of the sugar being treated and can be readily determined by experiment. FIGURE 2 is a graph showing the rate of alpha-d-glucose formation when conditioning sugars of various particle size at temperatures in the range from about 120 to about 160° F. Similar graphs can be obtained experimentally for other temperature ranges and other sugar particle sizes. It will be seen from FIGURE 2 that little or no increase was obtained in the alpha-d-glucose content of the finely divided sugar product (less than 8 mesh particle size). This is attributed to the fact that the finely divided sugar tends to dry rapidly and does not retain at least the minimum amount of moisture needed to promote mutarotation of the isomers. After discharge from conditioner 40, the conditioned sugar product having a desired high content of alpha-d-glucose can be ground to a finely divided particle size in mill 36 and then dried in dryer 38 as previously indicated.

The following specific examples, illustrative of the principles of the invention, demonstrate the continuous process of the invention for production of glucose sugar.

*Example I*

Approximately 3600 pounds of corn starch were dispersed in water and the aqueous slurry thereof then liquefied by treatment with bacterial alpha-amylase to a solids level of about 27–30 percent. A culture liquor containing purified glucamylase enzyme was then added to the liquefied corn starch to convert the starch to sugar. The enzymatic hydrolysis was allowed to proceed for 60 hours at 140° F. and a pH of 4.0–4.2. The hydrolyzate assayed 97.5–98.2 G.E. (glucose equivalent referring to the reducing sugar content calculated as glucose and expressed as percent by weight of material). The hydrolyzate was then filtered in a plate and frame filter press using a commercial filter aid, Sil Flo Grade 0272, which is a perlite type filter aid at a level of 2 to 3 grams per 100 milliliters of hydrolyzate. Approximately 1–2 percent (40–80 pounds) flocculent non-solubles were separated and the filtrate had only a slight color. The filtrate was passed through a series of ion exchange columns containing conventional commercial ion exchange resins which serve to remove color-forming and ash-forming bodies. The columns were arranged in the order: cation, anion, cation and anion. The resins employed are both commercially available resins. The filtrate was passed through the ion exchange columns at a rate of approximately two gallons per minute in a down flow direction. The purified filtrate consisting of a thin sugar syrup of approximately 27–30 percent solids content was then concentrated in a conventional forced circulation evaporator wherein the temperature of the liquid was maintained below about 120° F. by operating under a vacuum of 27–28 inches mercury. In this primary evaporation step the sugar syrup was concentrated to approximately 70–75 percent solids level and the relatively thick syrup was further concentrated in a second evaporator. For the secondary evaporation a wiped film evaporator operating under a vacuum of 20–21 inches mercury was employed. The temperature of the distillate was about 159–161° F. and the sugar syrup was concentrated to a solids level of about 93–96 percent. The concentrated sugar syrup (93–96% solids) was pumped from the secondary evaporator and passed through a gear type pump operated at about 300 revolutions per minute. The action of the gear pump created a vacuum and sucked in small amounts of air through a bleed line located adjacent the inlet of the pump. The concentrated sugar syrup upon passing through the gear pump in the presence of air was subjected to high shear stresses with the result that a creamy and frothy viscous material, containing a mass of fine sugar crystal nuclei, was discharged from the gear pump. This material was immediately deposited on the hot section of a moving belt conveyor. The hot section of the belt conveyor, 4.5 feet in length, was maintained at a temperature of about 160–170° F. The belt conveyor was operated at a speed such that the sugar remained on the hot section for approximately three minutes before passing to the cooling section of the conveyor belt. The cooling section of the conveyor belt, 4.5 feet in length, was maintained at a temperature of about 67–71° F. The sugar remained on the cooling section of the conveyor belt for approximately three minutes and was discharged therefrom in the form of a continuous sheet or slab (6" wide, ¼" thick) at a temperature of about 90–100° F. Within the six minutes that the sugar was on the conveyor belt the material changed from a creamy froth to a hard brittle sugar product which on analysis comprised about 49.1 percent alpha-d-glucose and 50.9 percent beta-d-glucose.

Since it was desired to increase the alpha-d-glucose content of the sugar product, the product was ground to produce chips approximately 2" x 2" x ¼" in size. These chips were then introduced into a conditioner which comprised a rotary cylinder having an inlet through which air at a temperature of 230–240° was introduced at a superficial velocity of 195 feet per minute. The feed rate of sugar to the conditioner was maintained at about 45–55 pounds per hour and the overall size of the conditioner was such that the residence time of the sugar within the conditioner was approximately four hours. The sugar product discharged from the conditioner was then milled through a coarse screen using a conventional mill and dried by heating in a pilot rotary dryer using air heated to 220–230° F. before being sent to storage. Approximately 3800–3900 pounds of corn sugar glucose were obtained from the original 3600 pounds of corn starch. The process was operated continuously for a period of 72 hours and the final sugar product assayed 99.7 percent solids having a glucose equivalent of 97.2 and contained 81.5 percent alpha-d-glucose.

*Example II*

Approximately 1200 pounds of corn starch were treated as described in Example I. However, in this instance the sugar product was conditioned by holding the granular product in the conditioner at a temperature of 120–160° F. for only one hour instead of four hours. The process was run continuously to produce 1250–1300 pounds of finished corn sugar having an assay: 99.4 percent solids having a glucose equivalent of 97.2 and containing 65 percent alpha-d-glucose.

*Example III*

Approximately 1300 pounds of corn starch were liquefied and hydrolyzed to a G.E. of 97.2 percent as described in Example I. The hydrolyzate was filtered and the filtrate liquor ion exchanged, concentrated, aerated, sheared and crystallized on the moving belt conveyor as in Example I. The hard brittle sugar slab discharged from the conveyor was ground to a particle size below about 8 mesh and dried immediately as in Example I. The sugar product which was not subjected to the conditioning treatment assayed 99.5 percent solids, 97.2 percent G.E. and 50 percent alpha-d-glucose, 50 percent beta-d-glucose.

It will be apparent from the foregoing that the process of the invention constitutes a significant advance in the art of producing sugars from starch. The present invention accomplishes all of the desired objects stated heretofore and permits glucose to be produced in high yields on a continuous basis in a manner not heretofore contemplated. In addition, with the process of the invention it is possible to selectively vary the content of the two isomers, alpha-d-glucose and beta-d-glucose, in the final sugar product.

Those modifications and equivalents which fall within the spirit of the invention and the scope of the appended claims are to be considered part of the invention.

We claim:

1. In a process for producing sugars from starch wherein the starch in aqueous system is hydrolyzed to convert the starch to sugar, the hydrolyzate is clarified and concentrated by evaporation, the improvement which consists in concentrating the hydrolyzate at an elevated temperature to a solids content above about 88 percent by weight, then subjecting the concentrated material at an elevated temperature in the presence of a gas to a shearing stress to induce solidification of a crystalline sugar, then removing at an elevated temperature said concentrated material from the action of the shearing stress, and finally recovering a solidified crystalline sugar.

2. The process of claim 1 wherein the amount of gas accompanying the concentrated hydrolyzate materal during shearing is at least about 3 cubic feet of gas per gallon of hydrolyzate.

3. A process for producing glucose which comprises hydrolyzing starch to convert the starch to glucose, clarifying the hydrolyzate, evaporating the hydrolyzate to a solids content above about 88 percent, subjecting the concentrated hydrolyzate at an elevated temperature in the presence of a gas to a shearing stress to induce solidification of crystalline glucose, then removing at an elevated temperature said concentrated material from the action of the shearing stress, and finally recovering the solidified glucose.

4. The process of claim 3 wherein the amount of gas accompanying the concentrated hydrolyzate material during shearing is at least about 3 cubic feet of gas per gallon of hydrolyzate.

5. A process for producing glucose which comprises hydrolyzing starch to convert the starch to glucose, clarifying the hydrolyzate, evaporating the hydrolyzate to a solids content above about 88 percent, subjecting the concentrated hydrolyzate at an elevated temperature in the presence of a gas to a shearing stress to induce solidification of crystalline glucose, then removing at an elevated temperature said concentrated material from the action of the shearing stress, and then cooling the so-treated material at a controlled rate to complete solidification of the glucose, drying the solid glucose and recovering the dried glucose.

6. The process of claim 5 wherein concentration of the hydrolyzate is accomplished in two stages to an ultimate solids content ranging from 92 to 99 percent.

7. The process of claim 5 wherein the amount of gas accompanying the concentrated hydrolyzate material during shearing is at least about 3 cubic feet of gas per gallon of hydrolyzate.

8. A process for producing glucose which comprises hydrolyzing starch to convert the starch to glucose, clarifying the hydrolyzate, evaporating the hydrolyzate to a solids content above about 88 percent, subjecting the concentrated hydrolyzate at an elevated temperature in the presence of a gas to a shearing stress to induce solidification of crystalline glucose, then removing at an elevated temperature said concentrated material from the action of the shearing stress, and then cooling the so-treated material at a controlled rate to complete solidification of the glucose, adjusting the ratio of alpha-d-glucose and beta-d-glucose in the solidified glucose by maintaining it in the presence of moisture at a temperature ranging from about 120 to 180° F. for a period of several minutes up to about 24 hours, then comminuting and drying the solid glucose and recovering the dried glucose.

9. The process of claim 8 wherein the amount of gas accompanying the concentrated hydrolyzate material during shearing is at least about 3 cubic feet of gas per gallon of hydrolyzate.

10. A continuous process for producing glucose which comprises hydrolyzing starch to convert the starch to glucose, filtering the hydrolyzate, evaporating the hydrolyzate filtrate to a solids content above about 88 percent, subjecting the concentrated hydrolyzate filtrate at an elevated temperature in the presence of a gas to a shearing stress to induce solidification of the crystalline glucose, then removing said concentrated material from the action of the shearing stress, depositing the so-treated material on a moving belt conveyor having zones thereon maintained at different temperatures with the material on the conveyor moving from a first zone of higher temperature to a second zone of lower temperature whereby complete solidification of the glucose is achieved, comminuting the solid glucose and drying the comminuted glucose.

11. The process of claim 10 wherein the amount of gas accompanying the concentrated hydrolyzate material during shearing is at least about 3 cubic feet of gas per gallon of hydrolyzate.

12. A continuous process for producing glucose which comprises hydrolyzing starch to convert the starch to glucose, filtering the hydrolyzate, evaporating the hydrolyzate filtrate to a solids content above about 88 percent, subjecting the concentrated hydrolyzate filtrate at an elevated temperature in the presence of a gas to a shearing stress to induce solidification of the crystalline glucose, then removing said concentrated material from the action of the shearing stress, depositing the so-treated material on a moving belt conveyor having zones thereon maintained at different temperatures with the material on the conveyor moving from a first zone of higher temperature to a second zone of lower temperature whereby complete solidification of the glucose is achieved, adjusting the ratio of alpha-d-glucose and beta-d-glucose in the glucose product by maintaining the glucose particles of size larger than 8 mesh in the presence of moisture at a temperature ranging from about 120 to 180° F. for a period of several minutes up to about 24 hours, and then comminuting and drying the glucose.

13. The process of claim 12 wherein the amount of gas accompanying the concentrated hydrolyzate material during shearing it at least about 3 cubic feet of gas per gallon of hydrolyzate.

14. A continuous process for producing glucose which comprises hydrolyzing starch to convert the starch to glucose, filtering the hydrolyzate, evaporating the hydrolyzate filtrate in two stages to an ultimate solids content of from 92 to 98 percent, mixing air with the concentrated hydrolyzate filtrate at an elevated temperature, subjecting the concentrated aerated material to a shearing stress to induce solidification of crystalline glucose, then removing said concentrated material from the action of the shearing stress, depositing the so-treated material on a moving belt conveyor having zones thereon maintained at different temperatures, the deposited material moving first over a zone maintained at a temperature of at least 90° F. and then moving over a zone maintained at a temperature not substantially above about 90° F. whereby solidification of the glucose is completed, comminuting the solid glucose and drying the comminuted solid glucose to a final moisture content not substantially in excess of 1 percent by weight.

15. The process of claim 14 wherein the amount of air accompanying the concentrated hydrolyzate material during shearing is at least about 3 cubic feet of air per gallon of hydrolyzate.

16. A continuous process for producing glucose which comprises hydrolyzing starch to convert the starch to glucose, filtering the hydrolyzate, evaporating the hydrolyzate filtrate in two stages to an ultimate solids content of from 92 to 98 percent, mixing air with the concentrated hydrolyzate filtrate, subjecting the concentrated aerated material at an elevated temperature to a shearing stress to induce solidification of crystalline glucose, then removing said concentrated material from the action of the shearing stress, depositing the so-treated material on a moving belt conveyor having zones thereon maintained at different temperatures, the deposited material moving first over a zone maintained at a temperature of at least 90° and then moving over a zone maintained at a temperature not substantially above about 90° F. whereby solidification of the glucose is completed, adjusting the ratio of alpha-d-glucose and beta-d-glucose in the glucose product by maintaining the glucose particles of size larger than 8 mesh in the presence of moisture at a temperature ranging from about 120 to 180° F. for a period of several minutes up to about 24 hours, and then comminuting and drying the solid glucose to a final moisture content not substantially in excess of 1 percent by weight.

17. The process of claim 16 wherein the amount of air accompanying the concentrated hydrolyzate material during shearing is at least about 3 cubic feet of air per gallon of hydrolyzate.

18. A continuous process for producing glucose which comprises hydrolyzing starch to convert the starch to glucose, filtering the hydrolyzate, evaporating the hydrolyzate filtrate to a solids content above about 88 percent subjecting the concentrated hydrolyzate filtrate at an elevated temperature in the presence of a gas to a shearing stress to induce solidification of crystalline glucose, then removing said concentrated material from the action of the shearing stress, depositing the so-treated material on a moving belt conveyor having zones thereon maintained at different temperatures with the material on the conveyor moving from a first zone of higher temperature to a second zone of lower temperature whereby solidification of the glucose is completed, adjusting the ratio of alpha-d-glucose and beta-d-glucose in the glucose product by maintaining the glucose particles of size larger than 8 mesh in the presence of moisture at a temperature ranging from about 120 to 160° F. for a period of about 4 hours, and then comminuting and drying the glucose to a final moisture content not substantially in excess of 1 percent by weight.

19. The process of claim 18 wherein the amount of gas accompanying the concentrated hydrolyzate material during shearing is at least about 3 cubic feet of gas per gallon of hydrolyzate.

20. A process of producing glucose which comprises hydrolyzing starch to convert the starch to glucose, clarifying the hydrolyzate, evaporating the hydrolyzate to a solids content of from about 92 to about 98%, subjecting the concentrated hydrolyzate at an elevated temperature in the presence of a gas to a shearing stress to induce solidification of glucose, removing at an elevated temperature said concentrated material from the action of the shearing stress, and then recovering the solidified glucose.

21. The process of claim 20 wherein the amount of gas accompanying the concentrated hydrolyzate material during shearing is at least about 3 cubic feet of gas per gallon of hydrolyzate.

References Cited by the Examiner

UNITED STATES PATENTS

| | | | |
|---|---|---|---|
| 1,722,761 | 7/1929 | Newkirk | 127—60 X |
| 1,870,030 | 8/1932 | Sovereign | 127—60 X |
| 2,189,824 | 2/1940 | Walsh | 127—58 |
| 2,429,964 | 10/1947 | Schopmeyer et al. | 127—58 |
| 2,606,847 | 8/1952 | Newkirk et al. | 127—58 X |
| 2,901,382 | 8/1959 | Rohwer | 127—58 |
| 2,967,804 | 1/1961 | Kerr | 195—11 |
| 2,970,086 | 1/1961 | Kerr | 195—11 |
| 3,064,722 | 11/1962 | Morgan et al. | 99—232 |

OTHER REFERENCES

Kerr, Chemistry and Industry of Starch (1950) Academic Press, N.Y., page 403.

Pigman, Chemistry of the Carbohydrates (1948), Academic Press, N.Y., pages 63–69.

MORRIS O. WOLK, *Primary Examiner.*